US012535663B2

(12) United States Patent
Dewald et al.

(10) Patent No.: US 12,535,663 B2
(45) Date of Patent: Jan. 27, 2026

(54) ASTIGMATISM-REDUCING ANAMORPHIC LENS ASSEMBLIES

(71) Applicant: Atlas Lens, Co, Glendale, CA (US)

(72) Inventors: Duane Scott Dewald, Glendale, CA (US); Dan Kanes, Glendale, CA (US)

(73) Assignee: Atlas Lens Co, Glendale, CA (US)

( * ) Notice: Subject to any disclaimer, the term of this patent is extended or adjusted under 35 U.S.C. 154(b) by 329 days.

(21) Appl. No.: 18/370,359

(22) Filed: Sep. 19, 2023

(65) Prior Publication Data

US 2025/0093628 A1 Mar. 20, 2025

(51) Int. Cl.
*G02B 13/08* (2006.01)
*G02B 13/18* (2006.01)
*G02B 15/22* (2006.01)

(52) U.S. Cl.
CPC ............ *G02B 13/08* (2013.01); *G02B 13/18* (2013.01); *G02B 15/22* (2013.01)

(58) Field of Classification Search
None
See application file for complete search history.

(56) References Cited

U.S. PATENT DOCUMENTS

| 2,890,622 | A | 6/1959 | Wallin | |
|---|---|---|---|---|
| 3,428,398 | A | 2/1969 | Gottschalk et al. | |
| 10,078,201 | B2 * | 9/2018 | Neil | G02B 3/06 |
| 10,126,533 | B1 * | 11/2018 | Caldwell | G02B 9/64 |
| 10,539,764 | B2 * | 1/2020 | Sasaki | G03B 37/06 |
| 2018/0284401 | A1 * | 10/2018 | Noethen | G02B 9/60 |

* cited by examiner

*Primary Examiner* — Darryl J Collins
(74) *Attorney, Agent, or Firm* — Nicholson De Vos Webster & Elliott LLP

(57) ABSTRACT

Anamorphic lens assembly having first and second anamorphic lens components, each having an astigmatism at infinity focus that is greater than an astigmatism at close focus. As the anamorphic lens assembly transitions from infinity focus to close focus, the astigmatism decreases for both of the first and second anamorphic lens components, which allows for proper focusing at close focus (when the object is close to the lens assembly). The astigmatism of the first anamorphic lens component may be equal and opposite to the astigmatism of the second anamorphic lens component, such that the astigmatisms of the anamorphic lens components cancel out one another.

20 Claims, 12 Drawing Sheets

ASTIGMATISM-REDUCING ANAMORPHIC LENS ASSEMBLIES

BACKGROUND

Anamorphic format is the cinematography technique of shooting a widescreen picture on standard 35 mm film or other visual recording media with a non-widescreen native aspect ratio. It also refers to the projection format in which a distorted image is stretched by an anamorphic projection lens to recreate the original aspect ratio on a viewing screen. An anamorphic lens typically includes a spherical primary lens, plus an anamorphic attachment (or an integrated lens element) that does the anamorphosing. The anamorphic element operates at infinite focal length, so that it has little or no effect on the focus of the primary lens it's mounted on, but still anamorphoses (distorts) the optical field. The distortion introduced in the camera must be corrected when the film is projected, so another lens is used in the projection booth that restores the picture back to its correct proportions to restore normal geometry. The picture is not manipulated in any way in the dimension that is perpendicular to the dimension that is anamorphosed.

Typically, an anamorphic lens captures (or projects) a wider horizontal angle of view than is normally possible with a spherical lens, in order to create a widescreen presentation. The anamorphic lens does this through optically distorting the image in the horizontal direction upon capture, and this distortion is then reversed in presentation. This method of widescreen image capture enables twice the width of the imager (typically) to be captured by distorting the image prior to recording, and then undistorting that compressed image later, either during post-production or during exhibition.

A traditional anamorphic lens optically compresses a wider angle of view onto a standard imager size by distorting the image's proportions, compressing the image horizontally. An alternative approach that achieves much the same result is to expand the image vertically. Either way, this horizontally squeezed (or vertically stretched) image is then undistorted into a widescreen aspect ratio through a corresponding anamorphic lens on a projector, or through digital correction of the distorted image.

An anamorphic lens assembly typically includes a spherical primary lens, plus an anamorphic attachment called an anamorphot (often an integrated multiple cylindrical-lens assembly) that does the squeezing (anamorphosing). The optical power of this attachment is typically zero in the vertical axis, such that it acts just like a piece of flat glass, and 0.5× in the horizontal axis, which reduces the effective focal length of the spherical lens by half in the horizontal direction. Most anamorphic systems work with this 0.5× compression (squeezing) optical power for gathering the image, which results in a 2× widening when presenting the image unsqueezed, although there are other compression ratios available, as well as the aforementioned vertical expansion approach. What this all means, generally, is that a 50 mm anamorphic lens will have the vertical angle of view of a 50 mm spherical lens, but the equivalent horizontal angle of view of a 25 mm spherical lens.

BRIEF DESCRIPTION OF DRAWINGS

Various examples in accordance with the present disclosure will be described with reference to the drawings, in which.

DETAILED DESCRIPTION

Figure 1:
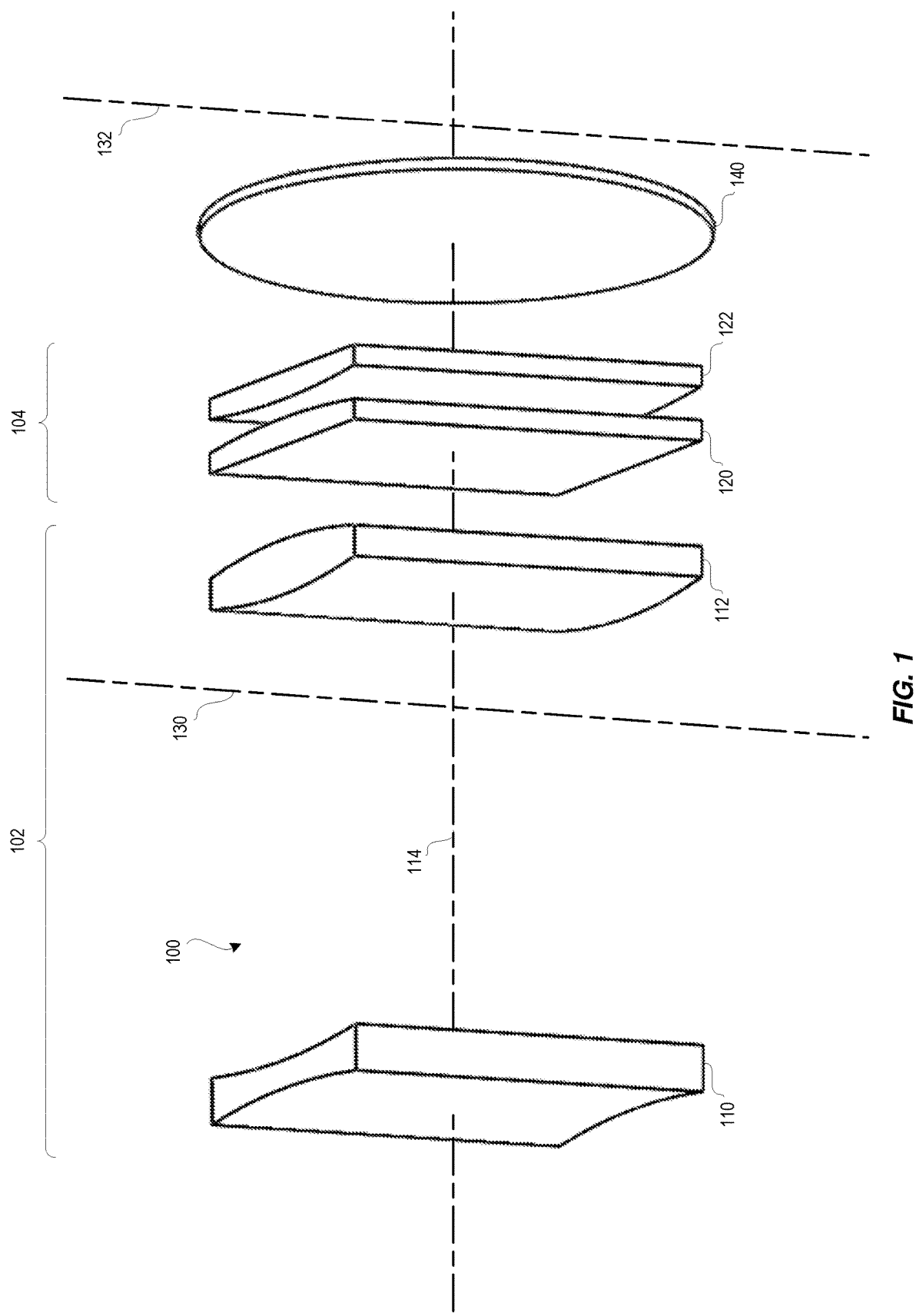
FIG. 1 is an oblique view of an astigmatism-reducing anamorphic lens assembly in an infinity-focus configuration according to some examples.

The present disclosure relates to anamorphic lens assemblies. Traditionally, anamorphic lenses have different focal lengths along the horizontal and vertical axes because of the cylindrical lenses that perform the anamorphosing. The different focal lengths in perpendicular directions create astigmatism as the focus becomes closer than infinity. A lens with astigmatism is one in which light rays that propagate through the lens in two perpendicular planes (e.g., a horizontal plane and a vertical plane) have different foci (points where the light rays converge). For example, if a lens with astigmatism is used to form an image of a cross, the horizontal and vertical lines of the cross will be in sharp focus at two different distances (a first distance for the horizontal line of the cross and a second distance for the vertical line of the cross).

Previous solutions to the astigmatism problem in anamorphic lenses include those described in U.S. Pat. No. 2,890,622 (Wallin, 1959) and U.S. Pat. No. 3,428,398 (Gottschalk, 1966). These solutions both include positive and negative cylindrical lenses, which Wallin refers to as astigmatizers.

The anamorphosing lenses in Wallin and Gottschalk are configured such that at infinity focus their combination has zero astigmatism. The astigmatizers in Wallin and Gottschalk are also configured such that their combination has zero astigmatism at infinity focus. The astigmatizers at infinity focus are aligned so that their optical power cancels out, and both are oriented such that their axes of cylindrical curvature are at 45° to vertical and parallel to one another. As the lens assembly transitions toward close focus, the anamorphosing lenses produce increasing astigmatism, while the astigmatizers counter-rotate (relative to each other) to produce astigmatism that is equal and opposite to that produced by the anamorphosing lenses. The astigmatisms of the various lens components cancel out, such that the complete lens assembly has zero astigmatism at all focus configurations.

Again, as Wallin's and Gottschalk's lens assemblies transition toward close focus, the astigmatizers counter-rotate until, at the close-focus limit, the astigmatizers are oriented such that their axes of cylindrical curvature are perpendicular to each other. At this point, the astigmatizers create their maximum astigmatism, which disadvantageously limits the ability of the complete lens assembly to achieve close focus. For example, with 0.75 diopter (positive and negative) astigmatizers, the theoretical limit of close focus for Wallin and Gottschalk is about 0.57 m (calculated from the difference between horizontal focus shift and vertical focus shift amounting to 2×0.75 D or 1.5 diopter), meaning any object closer to the lens than about 0.57 m cannot be properly focused. Another drawback to these solutions is that the tolerance on the orientation of the astigmatizers is very small (<0.2°) near the infinity focus configuration, making it very difficult to achieve good focus near the infinity focus configuration.

Some of the present embodiments solve the above-described technical problems by providing an anamorphic lens assembly having first and second anamorphic lens components, each having an astigmatism at infinity focus that is greater than an astigmatism at close focus. Thus, as the anamorphic lens assembly transitions from infinity focus to close focus the astigmatism decreases for both of the first and second anamorphic lens components, which allows for proper focusing at close focus (when the object is close to the lens assembly). In some embodiments, the astigmatism of the first anamorphic lens component is equal and opposite to the astigmatism of the second anamorphic lens component, such that the astigmatisms of the anamorphic lens components cancel out one another.

FIG. 1 is an oblique view of an astigmatism-reducing anamorphic lens assembly 100 in an infinity-focus configuration according to some examples. The illustrated embodiment includes a first anamorphic lens component 102 and a second anamorphic lens component 104. In various embodiments, the second anamorphic lens component 104 may be referred to as a de-astigmatizer, because it has an astigmatism that is equal and opposite to an astigmatism of the first anamorphic lens component 102.

As shown in FIG. 1, the illustrated example of the first anamorphic lens component 102 includes a first cylindrical lens element 110 and a second cylindrical lens element 112. Positions and orientations of the first and second cylindrical lens elements 110, 112 are fixed with respect to one another, and with respect to an optical axis 114 of the anamorphic lens assembly 100. Each of the first and second cylindrical lens elements 110, 112 has an axis of cylindrical curvature (not shown), and the respective axes are orthogonal to one another. Either or both of the first and second cylindrical lens elements 110, 112 may have cylindrical optical power at infinity focus such that a combined cylindrical optical power of the first and second cylindrical lens elements 110, 112 provides a desired amount of anamorphosing (e.g., squeezing or stretching). In some embodiments, the first cylindrical lens element 110 has negative cylindrical optical power and the second cylindrical lens element 112 has positive cylindrical optical power. In alternative embodiments, however, either of the first and second cylindrical lens elements 110, 112 may have any type of optical power. The first and second cylindrical lens elements 110, 112 in combination provide the first anamorphic lens component 102 with a first astigmatism at infinity focus and a second astigmatism at close focus, where the first astigmatism is greater than the second astigmatism. For example, whereas prior techniques have designed the cylindrical lenses such that they have the desired squeeze ratio and no astigmatism at infinity focus, in some of the present embodiments the first and second cylindrical lens elements 110, 112 have residual astigmatism at infinity focus, but this astigmatism is balanced (corrected) by two additional cylindrical lens elements, as described below.

As shown in FIG. 1, the illustrated example of the second anamorphic lens component 104 includes a third cylindrical lens element 120 and a fourth cylindrical lens element 122. Positions of the third and fourth cylindrical lens elements 120, 122 along the optical axis 114 are fixed with respect to one another, but the third and fourth cylindrical lens elements 120, 122 are rotatable with respect to one another about the optical axis 114, as described below. Each of the third and fourth cylindrical lens elements 120, 122 has a respective axis of cylindrical curvature 130, 132, and the respective axes 130, 132 are oriented parallel to one another in the infinity-focus configuration shown in FIG. 1. In some embodiments, the third cylindrical lens element 120 has positive cylindrical optical power at infinity focus and the fourth cylindrical lens element 122 has positive cylindrical optical power at infinity focus. In some embodiments, the third and fourth cylindrical optical powers have equal magnitude, but in alternative embodiments the third and fourth cylindrical optical powers may have unequal magnitude. In some embodiments, the third cylindrical optical power is equal to half the combined cylindrical optical power of the first and second cylindrical lens elements 110, 112, and the fourth cylindrical optical power is equal to half the combined cylindrical optical power of the first and second cylindrical lens elements 110, 112, where the combined cylindrical optical power of the first and second cylindrical lens elements 110, 112 has opposite sign to the combined cylindrical optical power of the third and fourth cylindrical lens elements 120, 122. In alternative embodiments, however, either of the third and fourth cylindrical lens elements 120, 122 may have any type (e.g., positive or negative) and/or magnitude of optical power. The third and fourth cylindrical lens elements 120, 122 in combination provide the second anamorphic lens component 104 with a third astigmatism at infinity focus and a fourth astigmatism at close focus, where the third astigmatism is greater than the fourth astigmatism. For example, whereas prior techniques have designed the cylindrical lenses such that they have the desired squeeze ratio and no astigmatism at infinity focus, in some of the present embodiments the first and second cylindrical lens elements 110, 112 have residual astigmatism at infinity focus, but this astigmatism is balanced (corrected) by the third and fourth cylindrical lens elements 120, 122.

In some embodiments, the anamorphic lens assembly 100 may be used in combination with at least one spherical lens 140. For example, the anamorphic lens assembly 100 may be used in combination with a camera, which may include one or more spherical lenses (and other types of lenses in some embodiments) that perform primary imaging (e.g., focusing) for an object in a field of view of the camera. Embodiments described below with reference to later figures provide additional details of example spherical lens assemblies used in combination with example anamorphic lens assemblies. In FIG. 1, a single spherical lens 140 represents a portion of one example spherical lens assembly, which may be part of a camera in some embodiments.

As the anamorphic lens assembly 100 transitions from an infinity-focus configuration (FIG. 1) toward a close-focus configuration (FIG. 3), the astigmatism generated by the first anamorphic lens component 102 increases. To counteract this increasing astigmatism, the third and fourth cylindrical lens elements 120, 122 are configured to counter-rotate (rotate in opposite directions) with respect to one another about the optical axis 114 of the anamorphic lens assembly 100 as the spherical lens assembly 140 transitions from the infinity-focus configuration toward the close-focus configuration. As the third and fourth cylindrical lens elements 120, 122 counter-rotate, the astigmatism generated by the second anamorphic lens component 104 (the counter-rotating cylindrical lens elements 120, 122) increases. This astigmatism, however, is equal and opposite to the astigmatism of the first anamorphic lens component 102, such that as the astigmatism of the first anamorphic lens component 102 increases, the astigmatism of the second anamorphic lens component 104 also decreases, and no net astigmatism is therefore generated by the anamorphic lens assembly 100 as a whole as the complete lens assembly (the spherical lens assembly 140 and the anamorphic lens assembly 100) transitions between the infinity-focus configuration and the close-focus configuration. The third and fourth cylindrical lens elements 120, 122, when in the infinity-focus configuration, create the maximum amount of balancing astigmatism. As they rotate toward the close-focus configuration, they create decreasing astigmatism and increasing spherical power.

Figure 2:
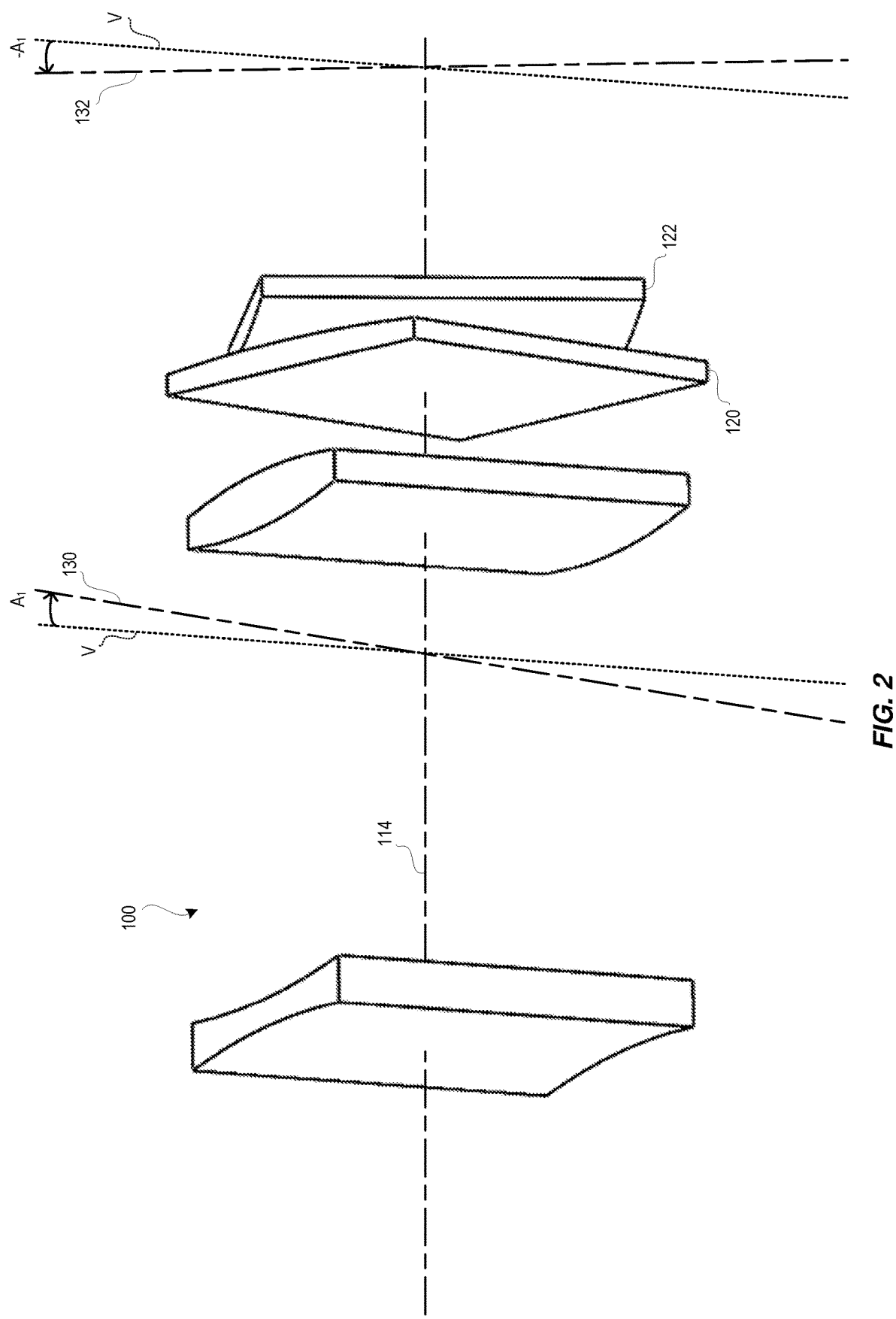
FIG. 2 is an oblique view of the lens assembly of FIG. 1 in an intermediate-focus configuration according to some examples.
Figure 3:
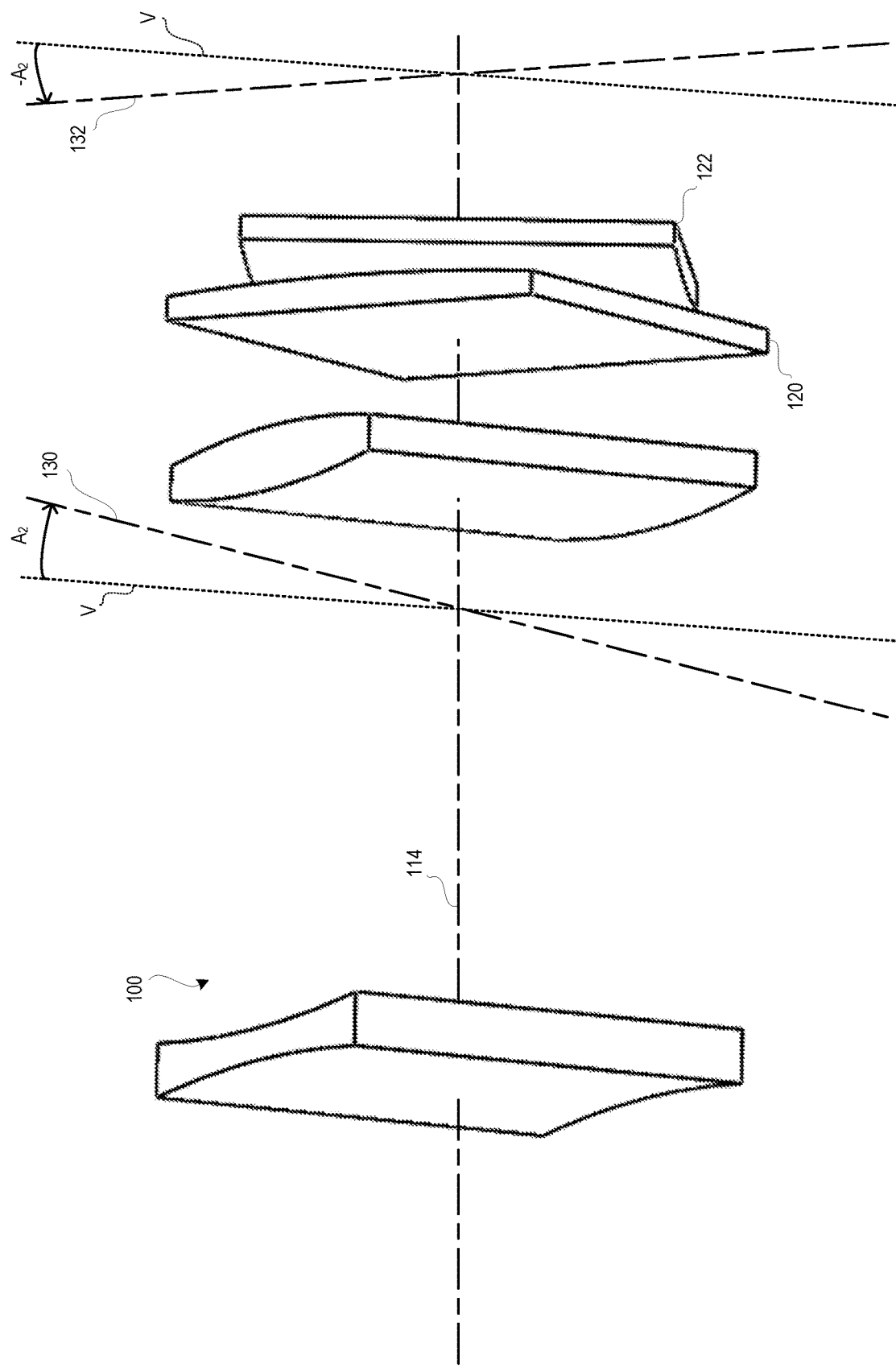
FIG. 3 is an oblique view of the lens assembly of FIG. 1 in a close-focus configuration according to some examples.

FIG. 2 is an oblique view of the anamorphic lens assembly 100 of FIG. 1 in an intermediate-focus configuration according to some examples, and FIG. 3 is an oblique view of the anamorphic lens assembly 100 of FIG. 1 in the close-focus configuration according to some examples. As described above, the third and fourth cylindrical lens elements 120, 122 are rotatable in opposite directions with respect to one another (counter-rotatable) about the optical axis 114 of the anamorphic lens assembly 100 as the anamorphic lens assembly 100 transitions from the infinity-focus configuration toward the close-focus configuration. Thus, FIG. 2 illustrates the third and fourth cylindrical lens elements 120, 122 in an intermediate-focus configuration in which the lens elements 120, 122 are rotated about the optical axis 114 by a first angle $A_1$ with respect to the vertical axis V. Similarly, FIG. 3 illustrates the third and fourth cylindrical lens elements 120, 122 in the close-focus configuration in which the lens elements 120, 122 are rotated about the optical axis 114 by a second, larger angle $A_2$ with respect to the vertical axis V. Since the third and fourth cylindrical lens elements 120, 122 rotate in opposite directions, the first and second angles $A_1$, $A_2$ are indicated to be positive for the third cylindrical lens element 120 and negative for the fourth cylindrical lens element 122. These signs are, however, arbitrarily assigned and could be reversed in some embodiments.

In various embodiments, the magnitudes of the first and second angles $A_1$, $A_2$ may have any values. For example, in one non-limiting embodiment the second angle $A_2$ may be ±45°, and the first angle $A_1$ may be any angle between 0° and ±45°. In such an embodiment, the third and fourth axes of cylindrical curvature 130, 132 (corresponding to the third and fourth cylindrical lens elements 120, 122, respectively) are oriented at an angle of 90° to one another when the anamorphic lens assembly 100 is in the close-focus configuration. In another non-limiting embodiment, the second angle $A_2$ may be ±35°, and the first angle $A_1$ may be any angle between 0° and ±35°. In such an embodiment, the third and fourth axes of cylindrical curvature 130, 132 are oriented at an angle of 70° to one another when the anamorphic lens assembly 100 is in the close-focus configuration. In another non-limiting embodiment, the second angle $A_2$ may be ±25°, and the first angle $A_1$ may be any angle between 0° and ±25°. In such an embodiment, the third and fourth axes of cylindrical curvature 130, 132 are oriented at an angle of 50° to one another when the anamorphic lens assembly 100 is in the close-focus configuration. It should be appreciated, however, that the foregoing values are merely examples. Alternative embodiments may include any values for the first and second angles $A_1$, $A_2$.

As described above, the second anamorphic lens component 104 (the third and fourth cylindrical lens elements 120, 122) has an astigmatism in the infinity-focus configuration (FIG. 1) and another astigmatism in the close-focus configuration (FIG. 3), and the astigmatism in the infinity-focus configuration is greater than the astigmatism in the close-focus configuration. In particular, in some embodiments, as the anamorphic lens assembly 100 transitions from the infinity-focus configuration toward the close-focus configuration the astigmatism created by the first anamorphic lens component 102 (the first and second cylindrical lens elements 110, 112) decreases due to the design of the first anamorphic lens component 102. Therefore, to maintain proper focus the third and fourth cylindrical lens elements 120, 122 (the de-astigmatizers) in combination produce decreasing cylindrical power as they counter-rotate away from the infinity-focus configuration. This counter-rotation produces decreasing astigmatism in the second anamorphic lens component 104, which allows proper focus. Advantageously, in some embodiments the third and fourth cylindrical lens elements 120, 122, when no longer aligned (when their axes of curvature are no longer parallel) begin to create spherical power, which can be used to assist the focus of the spherical lens assembly 140. When the axes are perpendicular to one another (in embodiments in which the third and fourth cylindrical lens elements 120, 122 are counter-rotatable by at least ±45°), the two cylindrical lens elements 120, 122 create no astigmatism and spherical power equal to the cylindrical optical power of each cylindrical lens element.

Figure 4:
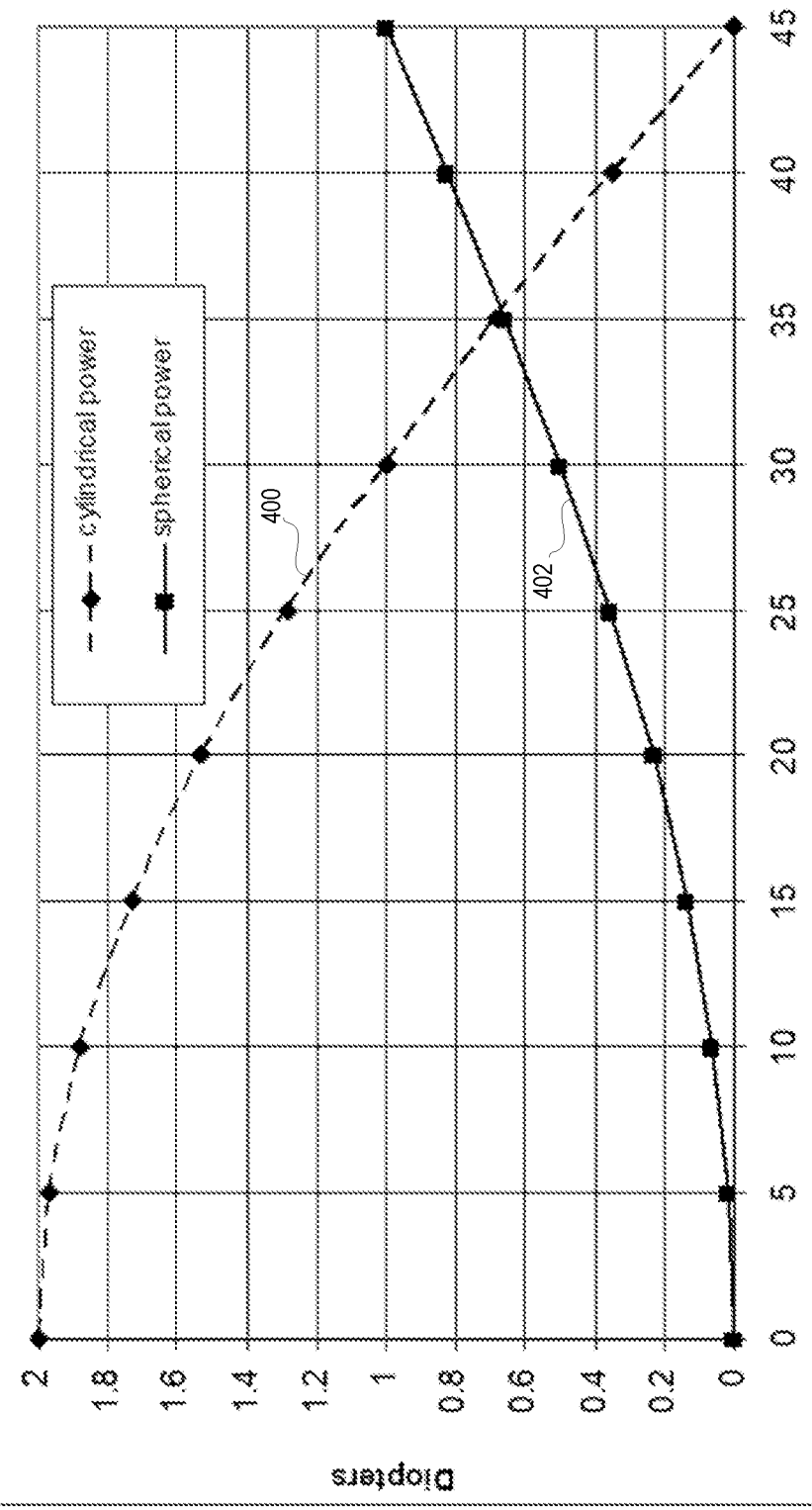
FIG. 4 is a plot illustrating cylindrical optical power and spherical optical power of the lens assembly of FIG. 1 as a function of rotational angle according to some examples.

FIG. 4 illustrates some advantages of the lens assemblies and focus techniques described in the present disclosure. In particular, FIG. 4 is a plot illustrating cylindrical optical power and spherical optical power of an example lens assembly similar to that of FIG. 1 as a function of rotational angle according to some examples. In the example of FIG. 4, the lens assembly has a spherical focal length of 50 mm and an anamorphic ratio of 2×, resulting in a horizontal focal length of 25 mm. It should be understood, however, that the lens assembly of FIG. 1 is not limited to these values for focal length or anamorphic ratio. In FIG. 4, the dashed curve 400 connecting the diamond-shaped data points illustrates the relationship between the cylindrical optical power of the second anamorphic lens component 104 and the rotational angles of the third and fourth cylindrical lens elements 120, 122 from the vertical orientation shown in FIG. 1. The solid curve 402 connecting the square-shaped data points illustrates the relationship between the spherical optical power of the second anamorphic lens component 104 and the rotational angles of the third and fourth cylindrical lens elements 120, 122 from the vertical orientation shown in FIG. 1. In this example embodiment, the second anamorphic lens component 104 produces +2 D (positive two diopters) of cylindrical optical power, and zero spherical optical power, when the third and fourth cylindrical lens elements 120, 122 are in the vertical orientation (FIG. 1), and zero cylindrical optical power, and +1 D of spherical optical power, when the third and fourth cylindrical lens elements 120, 122 are rotated ±45° from the vertical orientation. In this example embodiment, the cylindrical optical power of the second anamorphic lens component 104 is equal to 2 D cos (2 A), where D is diopters and A is the rotational angle of the cylindrical lens elements from the vertical orientation. Also in this example embodiment, the spherical optical power of the second anamorphic lens component 104 is equal to 2 D sin $(A)^2$. With reference to the left-hand side of FIG. 4, the change in cylindrical power of the second anamorphic lens component 104 with angle is advantageously small when the third and fourth cylindrical lens elements 120, 122 are nearly aligned. This characteristic makes the angular tolerances on the third and fourth cylindrical lens elements 120, 122 much larger near infinity focus, meaning that small changes in the angular orientations of the third and fourth cylindrical lens elements 120, 122 will not have a large impact on the focus of the anamorphic lens assembly 100 near infinity focus.

Figure 5:
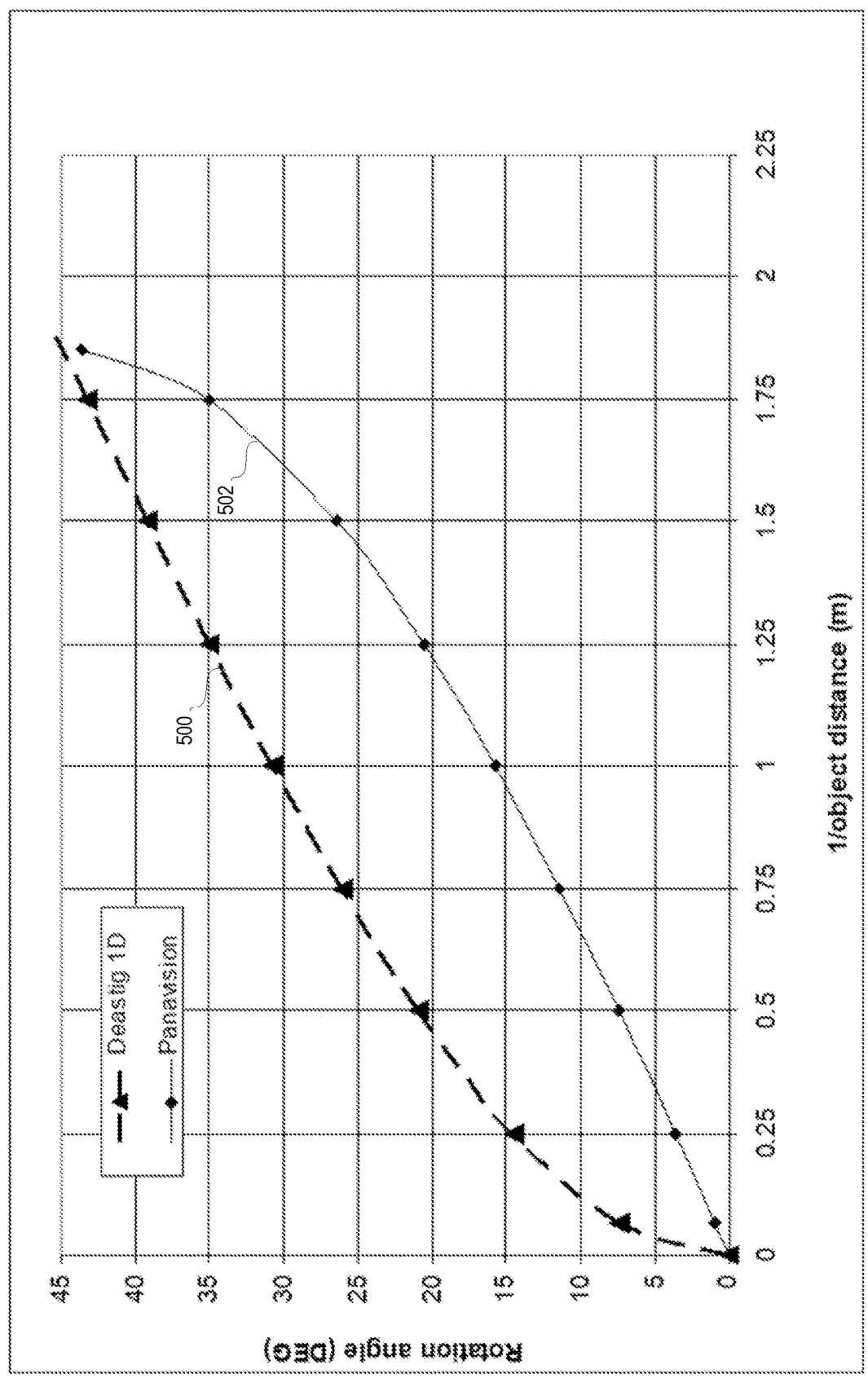
FIG. 5 is a plot illustrating a relationship between rotational angle and object distance at focus for the lens assembly of FIG. 1 according to some examples, and a relationship between rotational angle and object distance at focus for another lens assembly.

FIG. 5 illustrates additional advantages of the lens assemblies and focus techniques described in the present disclosure. In particular, FIG. 5 is a plot illustrating a relationship between rotational angle and object distance at focus for an example lens assembly similar to that of FIG. 1 according to some examples, and a relationship between rotational angle and object distance at focus for another lens assembly. In the example of FIG. 5, the lens assembly has a spherical focal length of 50 mm and an anamorphic ratio of 2×, resulting in a horizontal focal length of 25 mm. It should be understood, however, that the lens assembly of FIG. 1 is not limited to these values for focal length or anamorphic ratio. In FIG. 5, The curve 500 connecting the triangle-shaped data points illustrates the relationship between the rotational angle of the second anamorphic lens component 104 and object distance at focus for the lens assembly of FIG. 1. The curve 502 connecting the diamond-shaped data points illustrates the relationship between the rotational angle of the astigmatizers and object distance at focus for the Gottschalk lens assembly described above. With reference to the left-hand side of FIG. 5, in this example embodiment the sensitivity to rotational angle near infinity focus (circled) is greatly reduced in the lens assembly of FIG. 1 as compared to the Gottschalk lens assembly. Between 4 m and 0.67 m, however, the sensitivity is nearly the same (the slopes of the curves are similar).

In various embodiments, the lens assemblies and focus techniques described in the present disclosure may provide additional advantages. For example, the anamorphic lens assembly 100 of FIG. 1 can be tested at infinity focus with all components aligned horizontally and vertically (mechanical datums). In another example, the increasing spherical power of the second anamorphic lens component 104 as the anamorphic lens assembly 100 transitions from the infinity-focus configuration toward the close-focus configuration advantageously reduces the focus travel of the spherical lens assembly 140. This advantage can in turn advantageously reduce the length of the overall lens assembly. In another example, an anamorphic adapter with the ability to achieve very close focus can be designed using the lens assemblies and focus techniques described in the present disclosure. In another example, ophthalmic lenses could be used with the lens assemblies and focus techniques described in the present disclosure for aberration correction. In another example, in wide-angle applications the lens assemblies and focus techniques described in the present disclosure do not create a widening of opposite corners of the image as a positive and negative cylinder pair would do.

Figure 6:
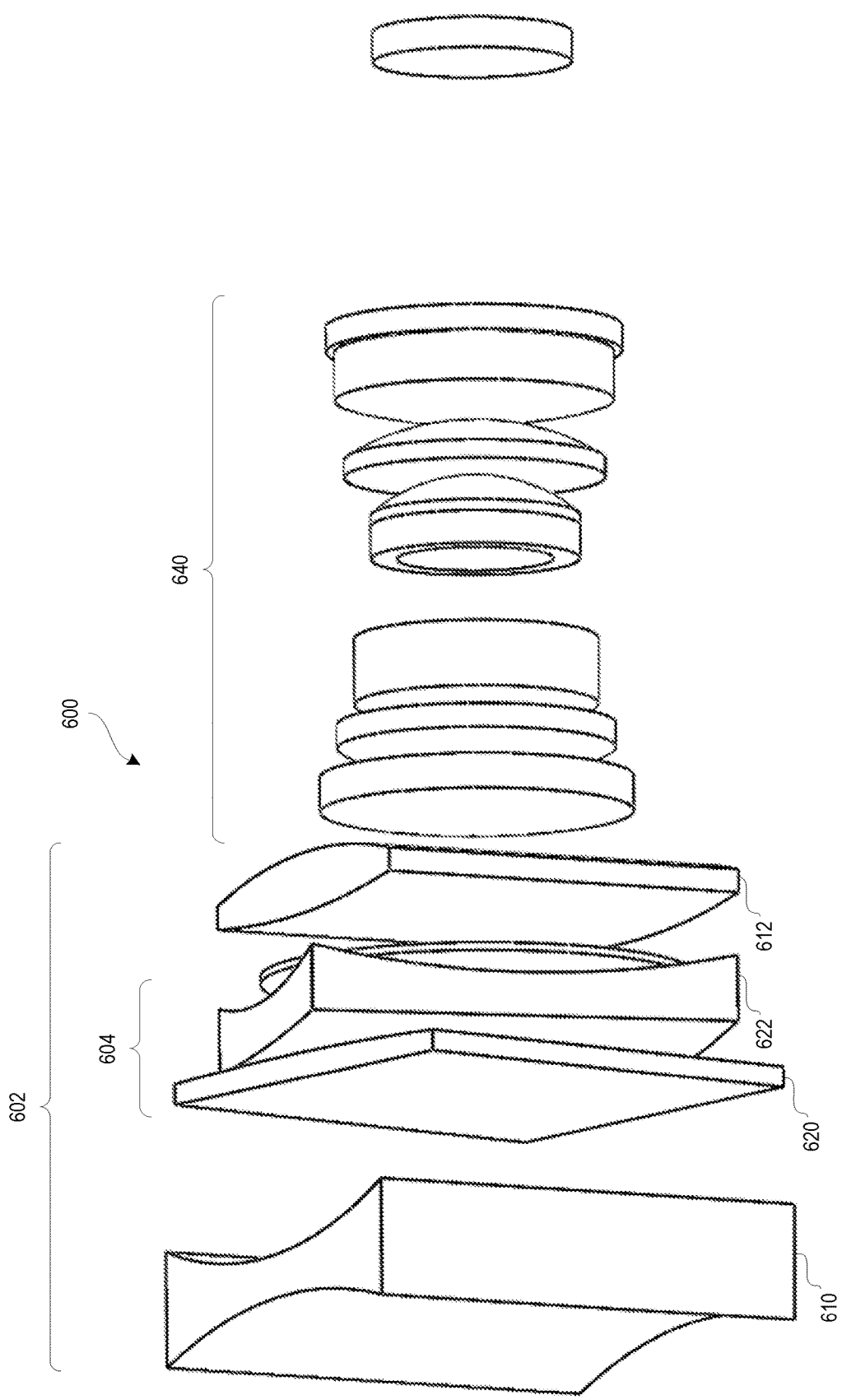
FIG. 6 is an oblique view of another astigmatism-reducing anamorphic lens assembly in a close-focus configuration according to some examples.

FIG. 6 is an oblique view of another astigmatism-reducing anamorphic lens assembly 600 in a close-focus configuration according to some examples. The illustrated embodiment includes a first anamorphic lens component 602 comprising a first cylindrical lens element 610 and a second cylindrical lens element 612, and a second anamorphic lens component 604 comprising a third cylindrical lens element 620 and a fourth cylindrical lens element 622. In contrast to the anamorphic lens assembly 100 of FIG. 1 in which the first and second anamorphic lens components 102, 104 are positioned sequentially, in the anamorphic lens assembly 600 of FIG. 6 the second anamorphic lens component 604 is positioned between the first and second cylindrical lens elements 610, 612 of the first anamorphic lens component 602. The anamorphic lens assembly 600 of FIG. 6 further includes a spherical lens assembly 640 for primary imaging. In some embodiments, the third and fourth cylindrical lens elements 620, 622 may have spherical optical power to assist in correcting aberrations in the complete lens assembly.

Figure 7:
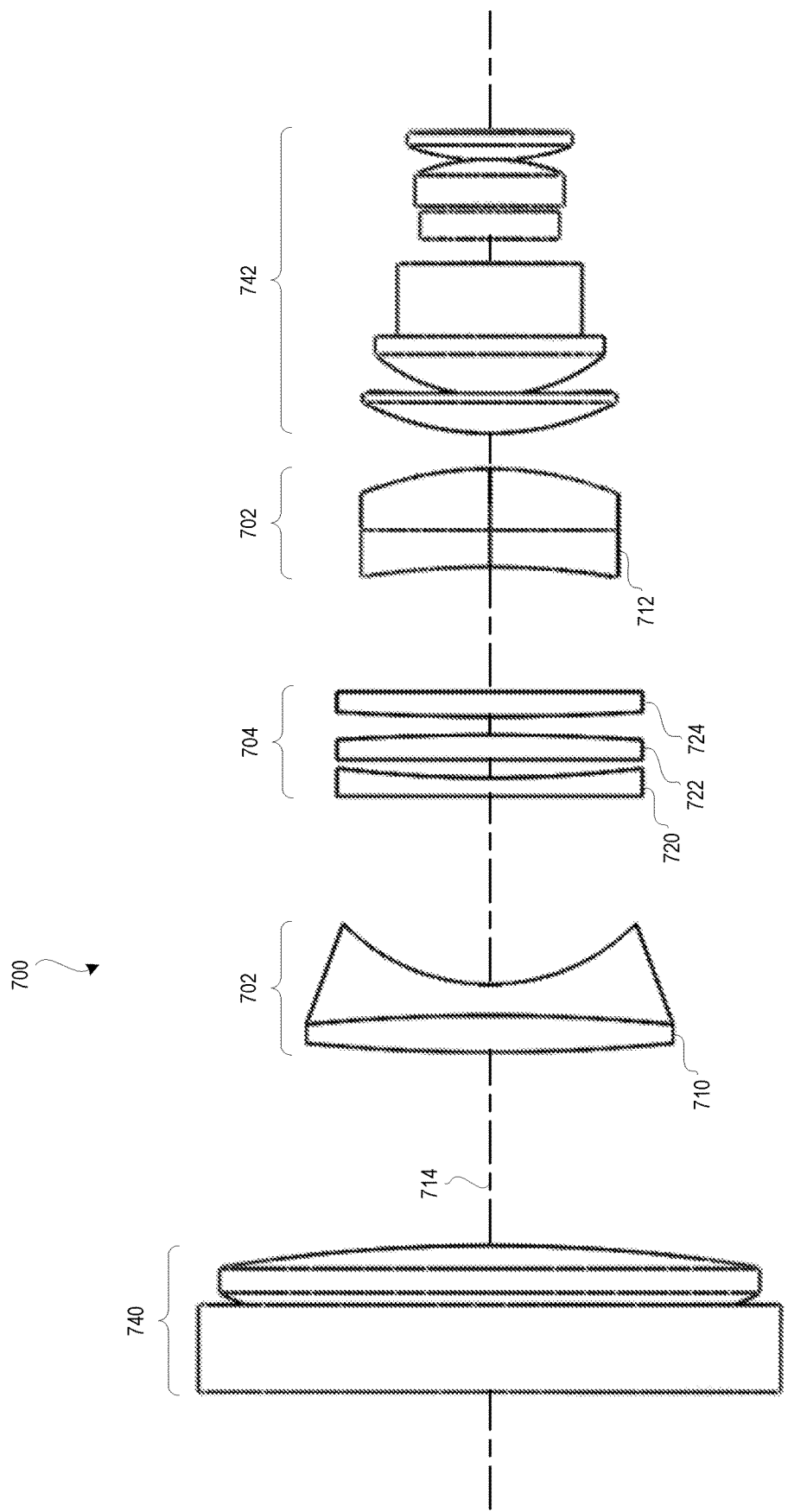
FIG. 7 is a top plan view of another astigmatism-reducing anamorphic lens assembly according to some examples.
Figure 8B:
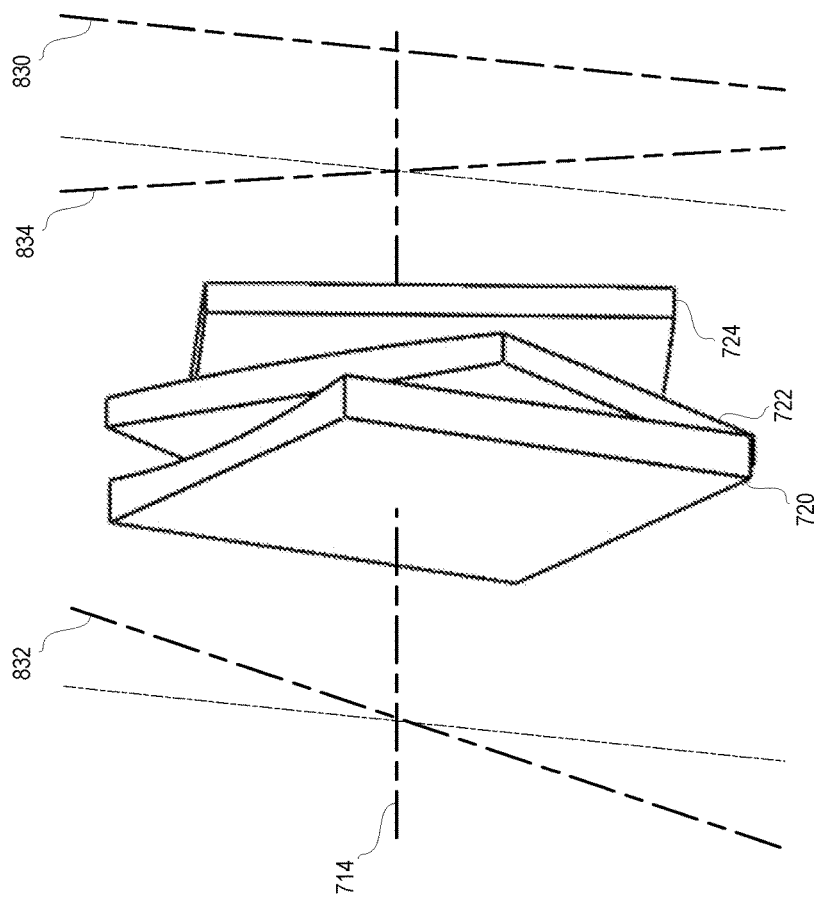
FIG. 8B is an oblique view of the cylindrical lens group of FIG. 8A in a close-focus configuration according to some examples.
Figure 8A:
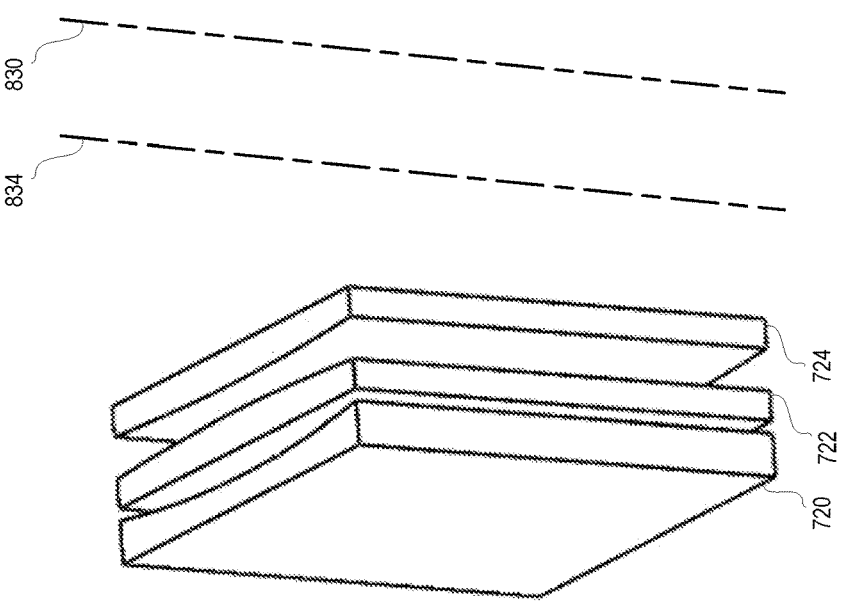
FIG. 8A is an oblique view of a cylindrical lens group of the lens assembly of FIG. 7 in an infinity-focus configuration according to some examples.

FIGS. 7, 8A, and 8B illustrate another astigmatism-reducing anamorphic lens assembly 700 according to some examples. With reference to FIG. 7, the illustrated embodiment includes a first anamorphic lens component 702 comprising a first cylindrical lens element 710 and a second cylindrical lens element 712, and a second anamorphic lens component 704 comprising a third cylindrical lens element 720, a fourth cylindrical lens element 722, and a fifth cylindrical lens element 724. In contrast to the anamorphic lens assembly 100 of FIG. 1, in which the first anamorphic lens component 102 has a greater astigmatism at infinity focus than at close focus, the first anamorphic lens component 702 of FIG. 7 has a greater astigmatism at close focus than at infinity focus. For example, the first anamorphic lens component 702 may have zero astigmatism at infinity focus in some embodiments. The second anamorphic lens component 704 of FIG. 7 similarly has a greater astigmatism at close focus than at infinity focus. For example, the second anamorphic lens component 704 may have zero astigmatism at infinity focus in some embodiments.

Also in contrast to the anamorphic lens assembly 100 of FIG. 1, in which the second anamorphic lens component 104 includes third and fourth cylindrical lens elements 120, 122, the second anamorphic lens component of FIG. 7 includes third, fourth, and fifth cylindrical lens elements 720, 722, 724. In the illustrated embodiment, the fourth and fifth cylindrical lens elements 722, 724 of the second anamorphic lens component of FIG. 7 are similar to the third and fourth cylindrical lens elements 120, 122 of the second anamorphic lens component 104 of FIG. 1. For example, positions of the third, fourth, and fifth cylindrical lens elements 720, 722, 724 along the optical axis 714 are fixed with respect to one another, but the fourth and fifth cylindrical lens elements 722, 724 are rotatable with respect to one another about the optical axis 714, as described below. The third cylindrical lens element 720, however, is not rotatable about the optical axis 714.

With reference to FIG. 8A, each of the third, fourth, and fifth cylindrical lens elements 720, 722, 724 has a respective axis of cylindrical curvature 830, 832, 834, and the respective axes 830, 832, 834 are oriented parallel to one another in the infinity-focus configuration shown in FIG. 8A. With reference to FIG. 8B, the fourth and fifth axes of cylindrical curvature 832, 834 move in opposite directions as the fourth and fifth cylindrical lens elements 722, 724 counterrotate toward the close-focus configuration. The third axis of cylindrical curvature 830 remains fixed, because the third cylindrical lens element 720 is not rotatable about the optical axis 714.

In some embodiments, the third cylindrical lens element 720 has negative cylindrical optical power at infinity focus, the fourth cylindrical lens element 722 has positive cylindrical optical power at infinity focus, and the fifth cylindrical lens element 724 has positive cylindrical optical power at infinity focus. In some embodiments, the third cylindrical optical power has equal magnitude, but opposite sign, relative to the fourth and fifth cylindrical optical powers combined. For example, if the third cylindrical optical power is −2 D (negative two diopters), then the fourth and fifth cylindrical optical powers combined are +2 D (e.g., the fourth cylindrical optical power may be +1 D and the fifth cylindrical optical power may be +1 D). In alternative embodiments, however, any of the third, fourth, and fifth cylindrical lens elements 720, 722, 724 may have any type (e.g., positive or negative) and/or magnitude of optical power.

As discussed above, in some embodiments the first anamorphic lens component 702 may have zero astigmatism at infinity focus, and the second anamorphic lens component 704 may also have zero astigmatism at infinity focus. However, the fourth and fifth cylindrical lens elements 722, 724 may have a combined nonzero astigmatism at infinity focus, while the third cylindrical lens element 720 also has a nonzero astigmatism at infinity focus, and the astigmatism of the third cylindrical lens element 720 is equal and opposite to the combined astigmatism of the fourth and fifth cylindrical lens elements 722, 724. The astigmatism of the third cylindrical lens element 720 thus cancels out the combined astigmatism of the fourth and fifth cylindrical lens elements 722, 724, such that the total combined astigmatism of the first, second, third, fourth, and fifth cylindrical lens elements 710, 712, 720, 722, 724 at infinity focus is zero. The second anamorphic lens component 704 can thus be added to existing anamorphic lens assemblies whose anamorphizers are configured to have zero astigmatism at infinity focus, with little to no modifications needed for the existing lenses.

For example, the lens assembly 700 illustrated in FIG. 7 comprises the Orion 80 mm lens (available from Atlas Lens Co. of Glendale, California) with the addition of the third, fourth, and fifth cylindrical lens elements 720, 722, 724. The lens assembly 700 includes a focus lens group 740 (may also be referred to as a diopter group) located to a first side of the anamorphic lens components 702, 704, and a spherical primary lens group 742 located to a second side of the anamorphic lens components 702, 704. The diopter group 740 remains fixed along the optical axis 714, while the spherical primary lens group 742 is translatable along the optical axis 714, and moves toward the anamorphic lens components 702, 704 for close focus. The Orion lens further includes the first and second cylindrical lens elements 710, 712 (comprising the first anamorphic lens component 702), and the illustrated embodiment adds the third, fourth, and fifth cylindrical lens elements 720, 722, 724 (comprising the second anamorphic lens component 704) to the existing Orion lens. The combined astigmatism of the diopter group 740, the first anamorphic lens component 702, and the spherical primary lens group 742 is zero at infinity focus. The second anamorphic lens component 704 can thus be added to the existing Orion lens with little to no modifications needed, because the second anamorphic lens component 704 also has a combined astigmatism of zero at infinity focus.

Figure 9A:
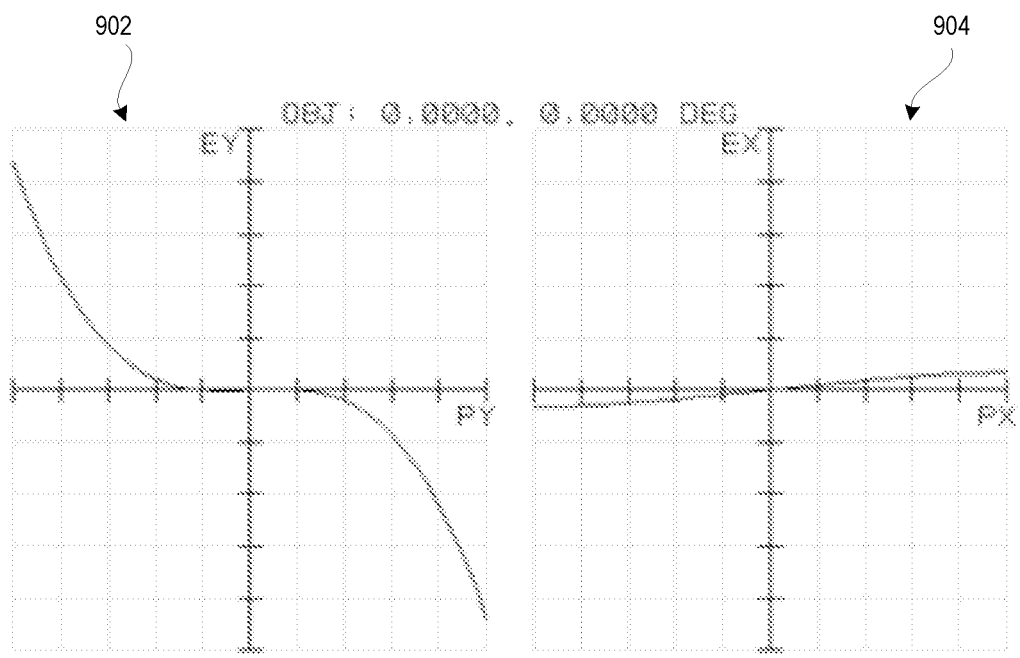
FIG. 9A is a transverse ray fan plot illustrating spherical aberration and astigmatism for an anamorphic lens assembly having two positive cylindrical lens elements in a close-focus configuration according to some examples.

As discussed above, the cylindrical lens elements in various embodiments may have positive or negative cylindrical power. In embodiments having two counter-rotating lenses with positive cylindrical power, the positive cylinders create positive spherical lens power as they counter-rotate toward the close-focus configuration. This positive spherical lens power adds to the spherical lens power of the primary lens (or primary lens group) and advantageously helps the overall lens assembly achieve close focus. However, the positive cylinders may also create spherical aberration as they counter-rotate toward the close-focus configuration. For example, the transverse ray fan plot shown in FIG. 9A illustrates spherical aberration 902 (plot on left-hand side) and astigmatism 904 (plot on right-hand side) for an anamorphic lens assembly having two positive cylindrical lens elements in the close-focus configuration according to some examples. As shown, the resulting spherical power of the counter-rotating positive cylindrical lens elements creates under-corrected spherical aberration in the close-focus configuration.

Figure 9B:
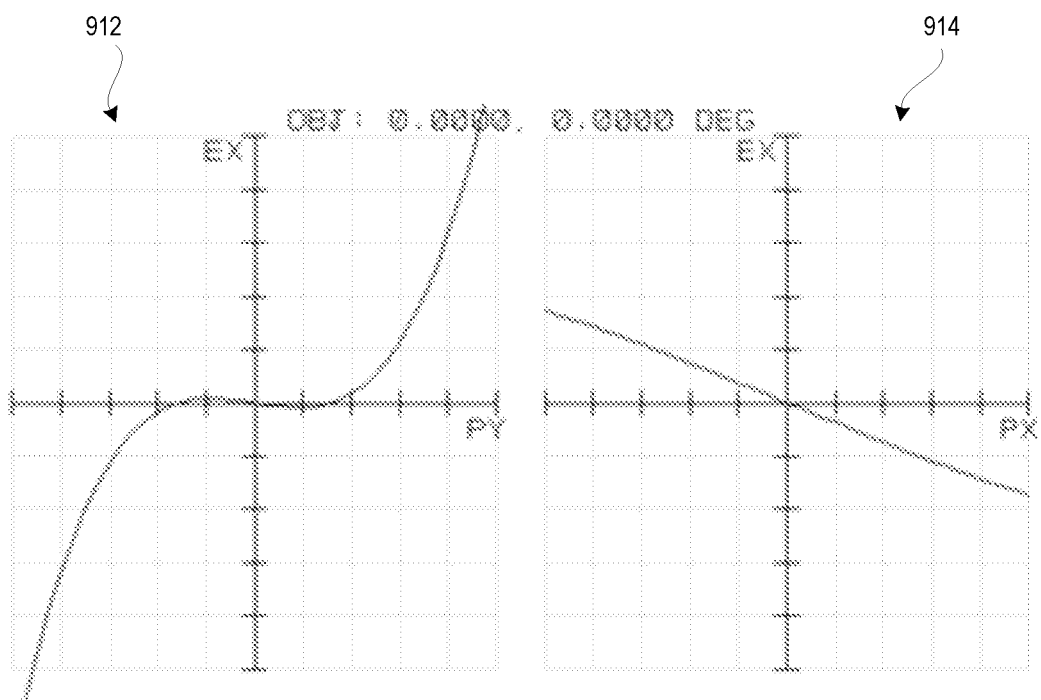
FIG. 9B is a transverse ray fan plot illustrating spherical aberration and astigmatism for an anamorphic lens assembly having two negative cylindrical lens elements in a close-focus configuration according to some examples.

In embodiments having two counter-rotating lenses with negative cylindrical power, the negative cylinders create negative spherical lens power as they counter-rotate toward the close-focus configuration. This negative spherical lens power counteracts the spherical lens power of the primary lens (or primary lens group) and therefore doesn't help the overall lens assembly achieve close focus. However, the negative cylinders may also create spherical aberration as they counter-rotate toward the close-focus configuration. For example, the transverse ray fan plot shown in FIG. 9B illustrates spherical aberration 912 (plot on left-hand side) and astigmatism 914 (plot on right-hand side) for an anamorphic lens assembly having two negative cylindrical lens elements in the close-focus configuration according to some examples. As shown, the resulting spherical power of the counter-rotating negative cylindrical lens elements creates over-corrected spherical aberration in the close-focus configuration.

Figure 10:
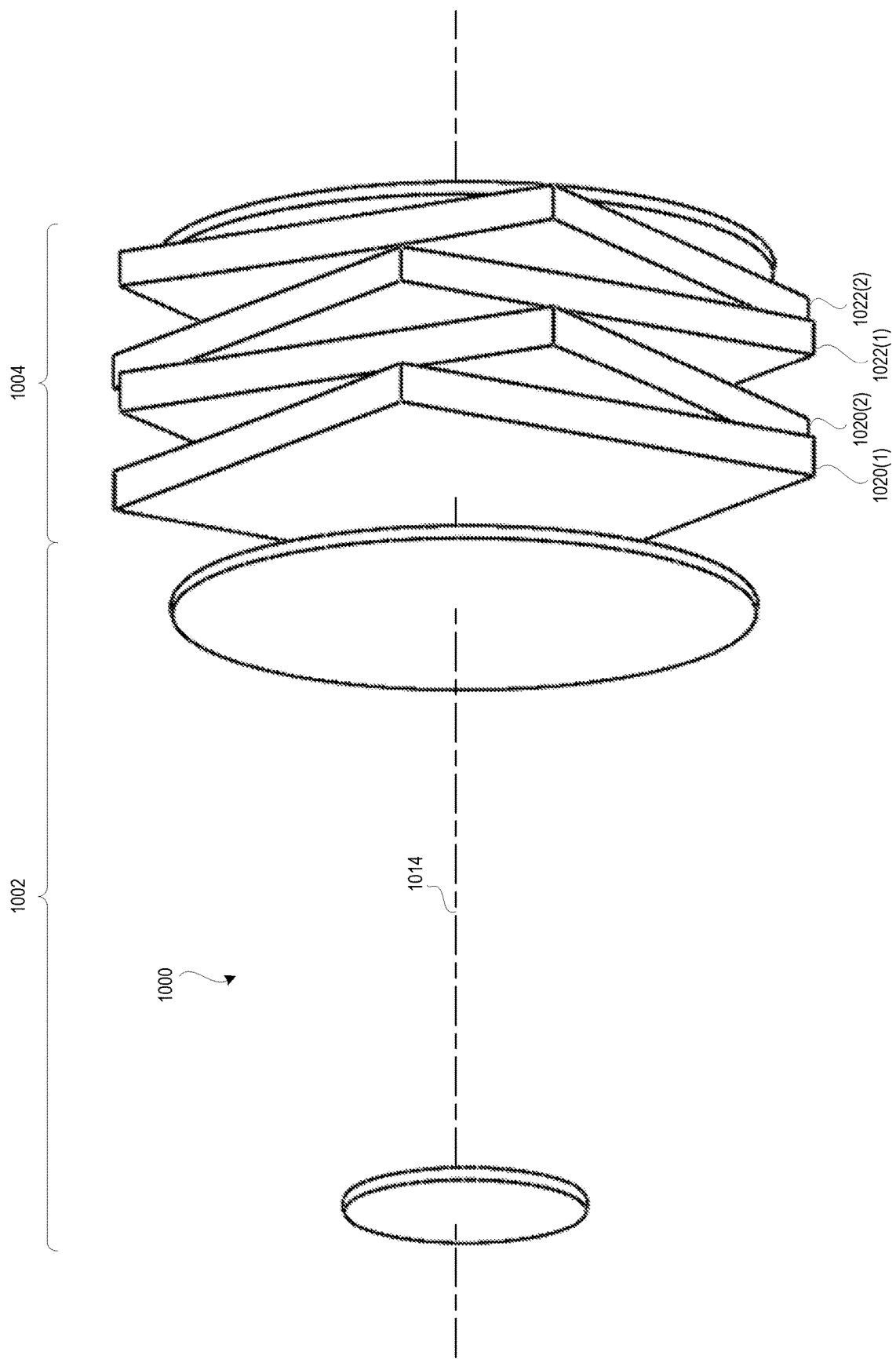
FIG. 10 is an oblique view of another astigmatism-reducing anamorphic lens assembly according to some examples.

FIG. 10 is an oblique view of another astigmatism-reducing anamorphic lens assembly 1000 according to some examples. The illustrated embodiment includes a first anamorphic lens component 1002 and a second anamorphic lens component 1004. The illustrated example of the second anamorphic lens component 1004 includes a first pair 1020 of cylindrical lens elements 1020(1), 1020(2) and a second pair 1022 of cylindrical lens elements 1022(1), 1022(2). In some embodiments, the lenses 1020(1), 1020(2) of the first pair 1020 of cylindrical lens elements have identical positive cylindrical power, and the lenses 1022(1), 1022(2) of the second pair 1022 of cylindrical lens elements have identical negative cylindrical power. Also in some embodiments, the combined power of the first pair 1020 of cylindrical lens elements 1020(1), 1020(2) is equal to the combined power of the second pair 1022 of cylindrical lens elements 1022(1), 1022(2), but of opposite sign, such that the combined power of all the cylindrical lens elements 1020(1), 1020(2), 1022(1), 1022(2) is zero. In one non-limiting example embodiment, the cylindrical power of each lens element 1020(1), 1020(2), 1022(1), 1022(2) is ±0.5 D. However, in alternative embodiments the cylindrical power of each lens element 1020(1), 1020(2), 1022(1), 1022(2) may have any other value. As in previous embodiments, in the infinity-focus configuration (not shown) the axes of cylindrical curvature of the first pair 1020 of cylindrical lens elements 1020(1), 1020(2) are oriented parallel to one another. Similarly, the axes of cylindrical curvature of the second pair 1022 of cylindrical lens elements 1022(1), 1022(2) are oriented parallel to one another in the infinity-focus configuration. However, the axes of cylindrical curvature of the first pair 1020 of cylindrical lens elements 1020(1), 1020(2) are orthogonal to the axes of cylindrical curvature of the second pair 1022 of cylindrical lens elements 1022(1), 1022(2) in the infinity-focus configuration. This configuration is similar to a Jackson cross cylinder, which is an instrument used by ophthalmologists and optometrists in eye examination.

Figure 11:
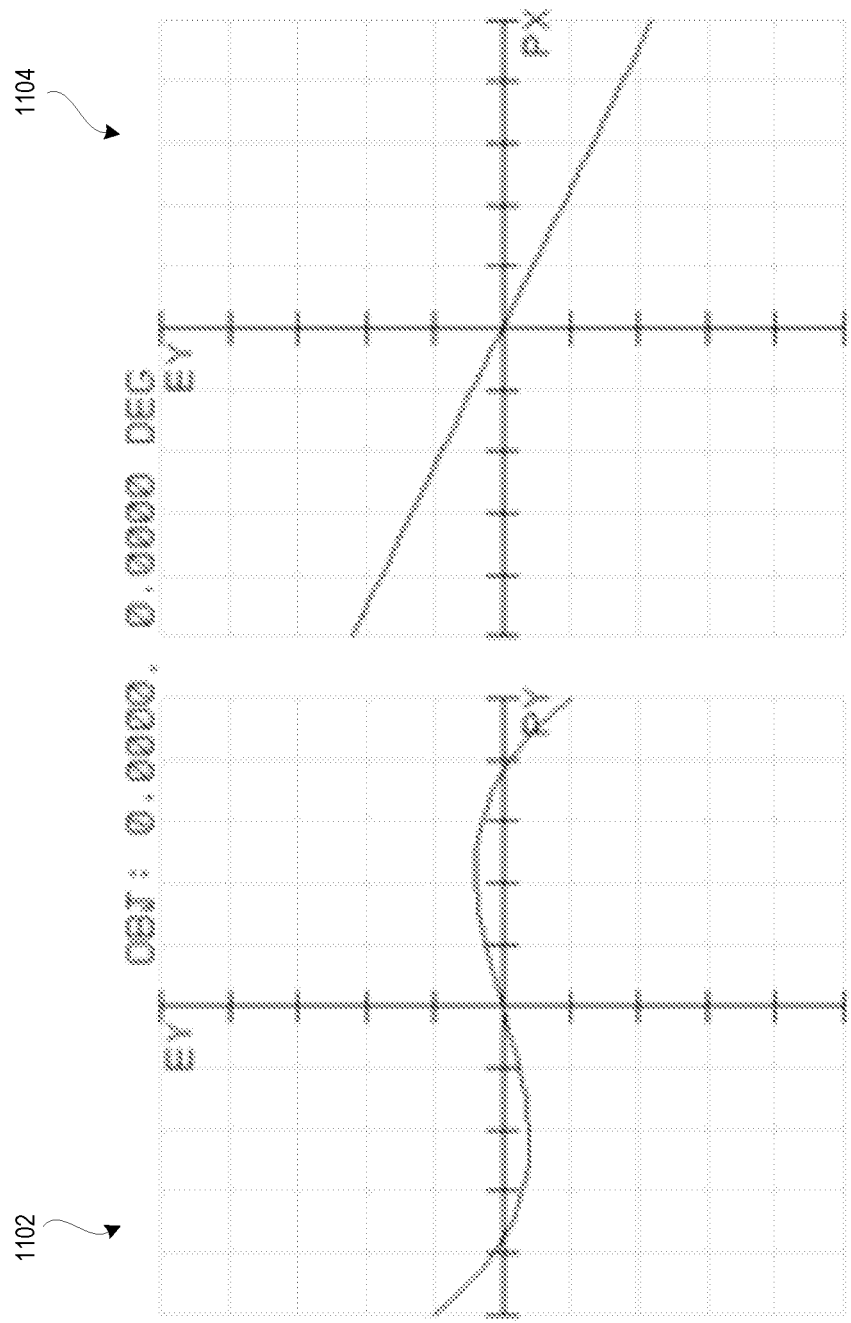
FIG. 11 is a transverse ray fan plot illustrating spherical aberration and astigmatism for the lens assembly of FIG. 10.

As in previous embodiments, the lenses 1020(1), 1020(2) of the first pair 1020 of cylindrical lens elements are counter-rotatable with respect to each other about the optical axis 1014, and the lenses 1022(1), 1022(2) of the second pair of cylindrical lens elements are counter-rotatable with respect to each other about the optical axis 1014. FIG. 10 illustrates the lens assembly in the close-focus configuration. As the overall lens assembly transitions from the infinity-focus configuration toward the close-focus configuration, no spherical power is created by the combined lens pairs 1020, 1022, and very little spherical aberration is created, because the power and spherical aberration created by the lens pairs 1020, 1022 individually are canceled out by the interaction of the positive lens pair 1020 and the negative lens pair 1022. In particular, the transverse ray fan plot shown in FIG. 11 illustrates spherical aberration 1102 (plot on left-hand side) and astigmatism 1104 (plot on right-hand side) for the anamorphic lens assembly of FIG. 10 in the close-focus configuration. As shown in the plot 1102 on the left-hand side, the under-corrected spherical aberration of the positive lens pair 1020 and the over-corrected spherical aberration of the negative lens pair 1022 cancel each other out, resulting in very little spherical aberration for the combined lens pairs 1020, 1022. In an example where the lenses 1020(1), 1020 (2), 1022(1), 1022(2) have zero thickness, the respective aberrations of the lens pairs 1020, 1022 would be completely offset. This characteristic of very little spherical aberration is advantageous for lens systems with low f-numbers (f/# or f/N). Low f-number lenses are desired for low-light photography and cinematography, or for artistic reasons. An f-number is a measure of the light-gathering ability of an optical system, such as a camera lens. It is calculated as the system's focal length divided by the diameter of the aperture (also called the entrance pupil). The f-number is also known as the focal ratio, f-ratio, or f-stop.

Figure 12:
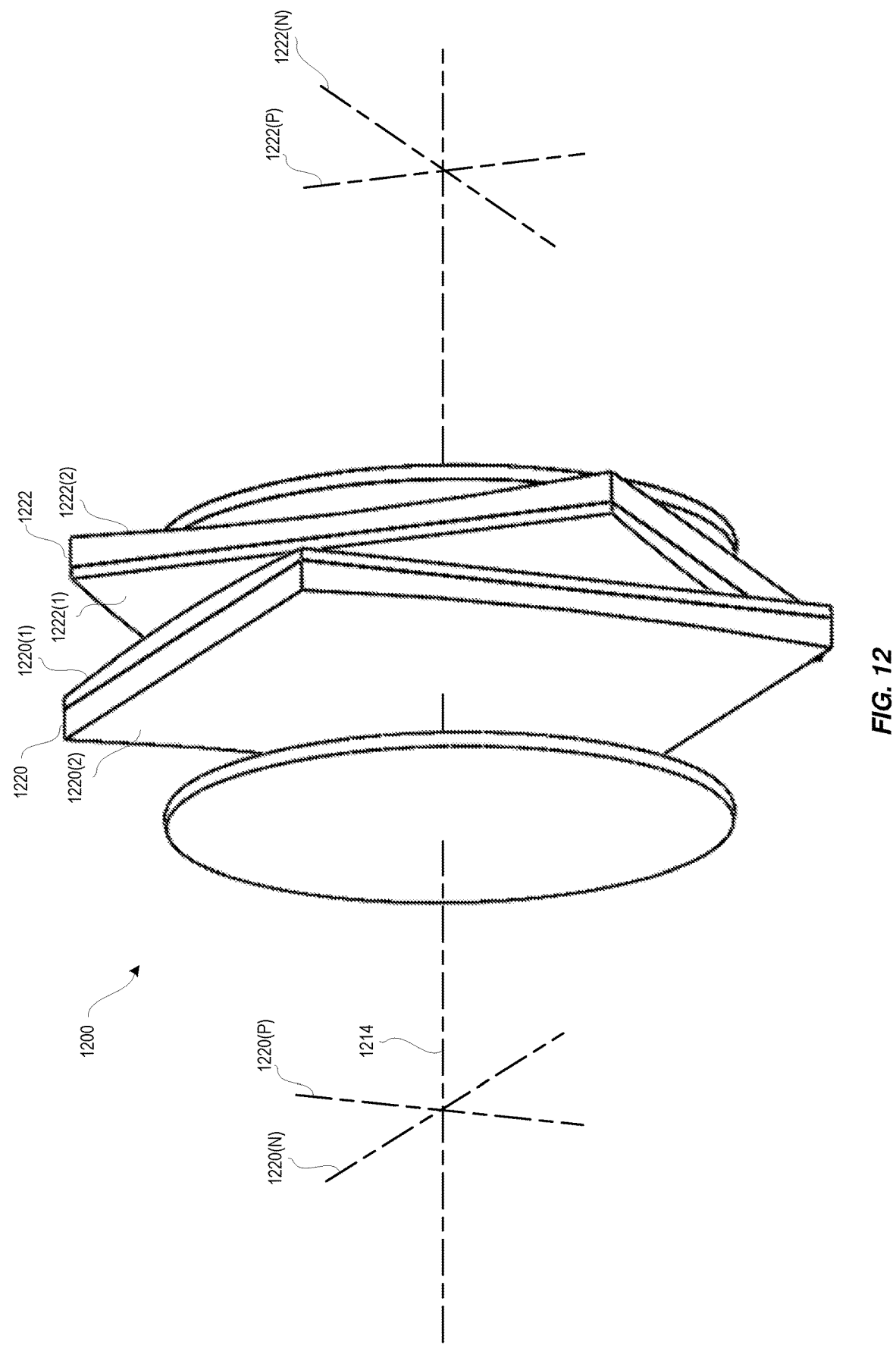
FIG. 12 is an oblique view of another astigmatism-reducing anamorphic lens assembly according to some examples.

In some embodiments, positive and negative cylindrical lens power may be combined into a single lens element. For example, FIG. 12 illustrates another astigmatism-reducing anamorphic lens assembly 1200 according to some examples. FIG. 12 illustrates the lens assembly 1200 in the close-focus configuration. The anamorphic lens assembly 1200 of FIG. 12 may have similar performance characteristics as the anamorphic lens assembly 1000 of FIG. 10, but is structurally simpler due to the reduced number of lens elements. In particular, the illustrated embodiment includes a first cylindrical lens element 1220 and a second cylindrical lens element 1222. As in previous embodiments, the cylindrical lens elements 1220, 1222 are counter-rotatable about the optical axis 1214. Each of the cylindrical lens elements 1220, 1222 includes a first surface 1220(1), 1222(1) having positive (convex) cylindrical curvature and a second surface 1220(2), 1222(2), opposite the first surface 1220(1), 1222 (1), having negative (concave) cylindrical curvature. For the individual lens elements 1220, 1222, the axis of positive cylindrical curvature 1220(P), 1222(P) is orthogonal to the axis of negative cylindrical curvature 1220(N), 1222(N). In the infinity-focus configuration, the axes of positive cylindrical curvature 1220(P), 1222(P) for the two lens elements 1220, 1222 are aligned, and the axes of negative cylindrical curvature 1220(N), 1222(N) for the two lens elements 1220, 1222 are aligned, but orthogonal to the axes of positive cylindrical curvature 1220(P), 1222(P), such that in the infinity-focus configuration the cylindrical lens elements 1220, 1222 appear as two plano-convex cylinders from the top, and two plano-concave cylinders from the side. In some embodiments, the opposite surfaces of each lens element 1220, 1222 have cylindrical lens powers of equal magnitude, but opposite sign. Thus, when the lens assembly is in the close-focus configuration, no spherical power is created by the combined lenses 1220, 1222, and very little spherical aberration is created, because the power and spherical aberration created by the lenses 1220, 1222 individually are canceled out by the interaction of the lenses 1220, 1222 with one another. In one non-limiting example embodiment, the cylindrical power of each surface 1220(1), 1222(1), 1220(2), 1222(2) is ±0.5 D. However, in alternative embodiments the cylindrical power of each surface 1220(1), 1222(1), 1220(2), 1222(2) may have any other value.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. An anamorphic lens assembly for a camera, the anamorphic lens assembly comprising:
   a first anamorphic lens component comprising:
      a first cylindrical lens element having a first cylindrical curvature about a first axis and a first cylindrical optical power at infinity focus; and
      a second cylindrical lens element having a second cylindrical curvature about a second axis and a second cylindrical optical power at infinity focus;
      wherein the first and second cylindrical lens elements have a combined cylindrical optical power at infinity focus; and
      wherein the first anamorphic lens component has a first astigmatism at infinity focus and a second astigmatism at close focus, and the first astigmatism is greater than the second astigmatism; and
   a second anamorphic lens component comprising:
      a third cylindrical lens element having a third cylindrical curvature about a third axis and a third cylindrical optical power equal to half the combined cylindrical optical power of the first and second cylindrical lens elements, the third cylindrical optical power having opposite sign relative to the combined cylindrical optical power of the first and second cylindrical lens elements; and
      a fourth cylindrical lens element having a fourth cylindrical curvature about a fourth axis and a fourth cylindrical optical power equal to half the combined cylindrical optical power of the first and second cylindrical lens elements, the fourth cylindrical optical power having opposite sign relative to the combined cylindrical optical power of the first and second cylindrical lens elements;
   wherein the third and fourth axes are parallel and oriented vertically when the anamorphic lens assembly is in an infinity-focus configuration, and the third and fourth axes are oriented at a non-zero angle with respect to one another when the anamorphic lens assembly is in a close-focus configuration;
   wherein the third and fourth cylindrical lens elements are rotatable in opposite directions with respect to one another about an optical axis of the anamorphic lens assembly as the anamorphic lens assembly transitions from the infinity-focus configuration toward the close-focus configuration;
   wherein the second anamorphic lens component has a third astigmatism in the infinity-focus configuration and a fourth astigmatism in the close-focus configuration, and the third astigmatism is greater than the fourth astigmatism;
   wherein the third and fourth cylindrical lens elements in combination have a fifth cylindrical optical power in the infinity-focus configuration and a sixth cylindrical optical power in the close-focus configuration, and the fifth cylindrical optical power is greater than the sixth cylindrical optical power; and
   wherein the third and fourth cylindrical lens elements in combination have no spherical optical power in the infinity-focus configuration and a non-zero spherical optical power in the close-focus configuration.

2. The anamorphic lens assembly of claim 1, wherein the second anamorphic lens component is positioned on an object side of the first anamorphic lens component.

3. The anamorphic lens assembly of claim 1, wherein the second anamorphic lens component is positioned between the first and second cylindrical lens elements of the first anamorphic lens component.

4. An anamorphic lens assembly, comprising:
   a first anamorphic lens component comprising:
      a first cylindrical lens element; and
      a second cylindrical lens element;
      wherein the first anamorphic lens component has a first astigmatism at infinity focus and a second astigmatism at close focus, and the first astigmatism is greater than the second astigmatism; and
   a second anamorphic lens component comprising:
      a third cylindrical lens element; and
      a fourth cylindrical lens element;
      wherein the third and fourth cylindrical lens elements are rotatable in opposite directions with respect to one another about an optical axis of the anamorphic lens assembly as the anamorphic lens assembly transitions from an infinity-focus configuration toward a close-focus configuration; and
      wherein the second anamorphic lens component has a third astigmatism in the infinity-focus configuration and a fourth astigmatism in the close-focus configuration, and the third astigmatism is greater than the fourth astigmatism.

5. The anamorphic lens assembly of claim 4, wherein the third and fourth cylindrical lens elements have identical cylindrical optical power, and are oriented such that axes of curvature of both the third and fourth cylindrical lens elements are vertical when the anamorphic lens assembly is in the infinity-focus configuration.

6. The anamorphic lens assembly of claim 4, wherein the third astigmatism is equal and opposite to the first astigmatism, such that the third astigmatism of the second anamorphic lens component cancels out the first astigmatism of the first anamorphic lens component at infinity focus.

7. The anamorphic lens assembly of claim 4, wherein the third and fourth cylindrical lens elements both have cylindrical optical power equal to half of a combined cylindrical optical power of the first and second cylindrical lens elements at infinity focus, the third cylindrical optical power having opposite sign relative to the combined cylindrical optical power of the first and second cylindrical lens elements, and the fourth cylindrical optical power having opposite sign relative to the combined cylindrical optical power of the first and second cylindrical lens elements.

8. The anamorphic lens assembly of claim 4, wherein respective axes of curvature of the third and fourth cylindrical lens elements are parallel and oriented vertically when the anamorphic lens assembly is in the infinity-focus configuration, and the axes of curvature are oriented at a non-zero angle with respect to one another when the anamorphic lens assembly is in the close-focus configuration.

9. The anamorphic lens assembly of claim 4, wherein the third and fourth cylindrical lens elements in combination have a first cylindrical optical power in the infinity-focus configuration and a second cylindrical optical power in the close-focus configuration, and the first cylindrical optical power is greater than the second cylindrical optical power.

10. The anamorphic lens assembly of claim 4, wherein the second anamorphic lens component is positioned on an object side of the first anamorphic lens component.

11. The anamorphic lens assembly of claim 4, wherein the second anamorphic lens component is positioned between the first and second cylindrical lens elements of the first anamorphic lens component.

12. The anamorphic lens assembly of claim 4, wherein at least one of the third cylindrical lens element or the fourth cylindrical lens element has a non-zero spherical optical power.

13. An anamorphic lens assembly, comprising:
a first anamorphic lens component comprising:
  a first cylindrical lens element; and
  a second cylindrical lens element;
  wherein the first anamorphic lens component has a first astigmatism at infinity focus; and
a second anamorphic lens component comprising:
  a third cylindrical lens element; and
  a fourth cylindrical lens element;
  wherein the third and fourth cylindrical lens elements are rotatable in opposite directions with respect to one another about an optical axis of the anamorphic lens assembly as the anamorphic lens assembly transitions from an infinity-focus configuration toward a close-focus configuration; and
  wherein the second anamorphic lens component has a second astigmatism in the infinity-focus configuration, and the second astigmatism is equal and opposite to the first astigmatism, such that the second astigmatism of the second anamorphic lens component cancels out the first astigmatism of the first anamorphic lens component when the anamorphic lens assembly is in the infinity-focus configuration.

14. The anamorphic lens assembly of claim 13, wherein the first anamorphic lens component has a third astigmatism at close focus, and the first astigmatism is greater than the third astigmatism.

15. The anamorphic lens assembly of claim 13, wherein the third and fourth cylindrical lens elements have identical cylindrical optical power, and are oriented such that axes of curvature of both the third and fourth cylindrical lens elements are vertical when the anamorphic lens assembly is in the infinity-focus configuration.

16. The anamorphic lens assembly of claim 13, wherein the third and fourth cylindrical lens elements both have cylindrical optical power equal to half of a combined cylindrical optical power of the first and second cylindrical lens elements at infinity focus, the third cylindrical optical power having opposite sign relative to the combined cylindrical optical power of the first and second cylindrical lens elements, and the fourth cylindrical optical power having opposite sign relative to the combined cylindrical optical power of the first and second cylindrical lens elements.

17. The anamorphic lens assembly of claim 13, wherein respective axes of curvature of the third and fourth cylindrical lens elements are parallel and oriented vertically when the anamorphic lens assembly is in the infinity-focus configuration, and the axes of curvature are oriented at a non-zero angle with respect to one another when the anamorphic lens assembly is in the close-focus configuration.

18. The anamorphic lens assembly of claim 13, wherein the third and fourth cylindrical lens elements in combination have a first cylindrical optical power in the infinity-focus configuration and a second cylindrical optical power in the close-focus configuration, and the first cylindrical optical power is greater than the second cylindrical optical power.

19. The anamorphic lens assembly of claim 13, wherein the second anamorphic lens component is positioned on an object side of the first anamorphic lens component.

20. The anamorphic lens assembly of claim 13, wherein the second anamorphic lens component is positioned between the first and second cylindrical lens elements of the first anamorphic lens component.

* * * * *